Dec. 22, 1964    R. B. RUSSELL    3,162,762
COPYING APPARATUS AND METHOD
Filed Sept. 16, 1960    3 Sheets-Sheet 1

*INVENTOR.*
ROBERT B. RUSSELL
BY
Porter, Chittick & Russell
ATTORNEY

Dec. 22, 1964  R. B. RUSSELL  3,162,762
COPYING APPARATUS AND METHOD
Filed Sept. 16, 1960  3 Sheets-Sheet 2

INVENTOR.
ROBERT B. RUSSELL
BY
Porter, Chittick & Russell
ATTORNEY

Dec. 22, 1964     R. B. RUSSELL     3,162,762
COPYING APPARATUS AND METHOD
Filed Sept. 16, 1960     3 Sheets-Sheet 3

INVENTOR.
ROBERT B. RUSSELL
BY
*Porter, Chittick & Russell*
ATTORNEY

United States Patent Office 3,162,762
Patented Dec. 22, 1964

3,162,762
COPYING APPARATUS AND METHOD
Robert B. Russell, 248 Park St., Newton 58, Mass.
Filed Sept. 16, 1960, Ser. No. 56,482
3 Claims. (Cl. 250—65)

This invention relates to a radiant energy copying apparatus and methods therefor. More specifically, this invention relates to the processes and apparatus described in my previous and copending applications S.N. 821,943, filed on June 22, 1959, now Patent No. 3,040,695, granted Aug. 7, 1962, and 37,669, filed on June 21, 1960, now Patent No. 3,121,791, granted Feb. 18, 1964.

One of the primary objects of this invention is to provide an apparatus useful in the practice of the process of my said copending applications which will be at one and the same time simple in operation and easy to thread up. The paper elements in my previous apparatus were hard to attach one to the other and if they broken during operation, a substantial time down period resulted. The present invention is designed for simplicity of operation, requiring little or no skill to attach and position the paper elements.

In another aspect, this invention has as an object the intensification of the image produced in the practice of the process. I have found that the condition of the transfer coating at the point of separation of the transfer sheet and the copy sheet is quite critical. Thus, if the separation takes place too soon, the transferred image has a very wet and stippled appearance and is not particularly intense. Likewise, if the separation takes place too far away from the point of application of the heat, the transfer coating seems to solidify and then adhere more to the transfer sheet than to the copy sheet with the result that the image likewise is relatively weak although, in this instance, it does not appear stippled. Also in connection with intensification of the image, I have found that a second application of radiant energy can be used likewise to print or intensify the image. Once the transfer coating has melted and partially transferred from the transfer sheet to the copy sheet then the transfer sheet appears to be more susceptible to absorption of applied radiation, and in addition it also then transmits the applied radiation to a greater degree. Thus, when I use a second source of applied radiation of a weaker intensity, I find that it further melts the coating and intensifies the transfer to the copy sheet in the areas where the coating was previously melted by the applied radiation and re-radiation from the letters during the first application of radiation.

Another object of the invention stemming from the steps I have taken to intensify the image, is the provision of a printing process in which the wax transfer sheet is used as a master. It will be understood that the coating on the transfer sheet is pulled away therefrom in the areas corresponding to the indicia on the original. Also it will be understood that these areas where the coating has been removed are more heat absorbent than are the areas thereof which have the full thickness of coating thereon. Thus, the sheet may be used as a master and at a critical point in the irradiation thereof, the portions of the said master where the wax has previously been partially removed will melt prior to the remaining portions thereof. If the sheets are separated at this point, a positive image transfers to the coating sheet. A variation of this method is to use the transfer sheet as a master together with a heat absorbent (carbon paper) element interleaved between it and the copy sheet. Thereafter the sheets are irradiated, the portions of the carbon paper corresponding to the letters on the master heat up more rapidly, melt and transfer imprinted black images to the copy sheet.

Further objects and features of my invention will best be understood from a detailed description of a preferred embodiment thereof selected for the purpose of illustration as shown in the accompanying drawings in which.

Figure 6:
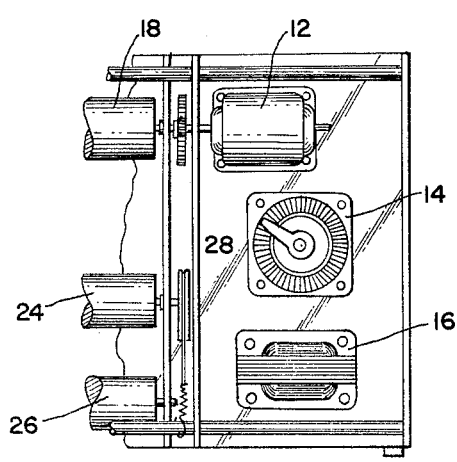
FIG. 6 is a view in front elevation of the right hand end of the machine, the cover removed likewise to show its internal elements.
Figure 7:
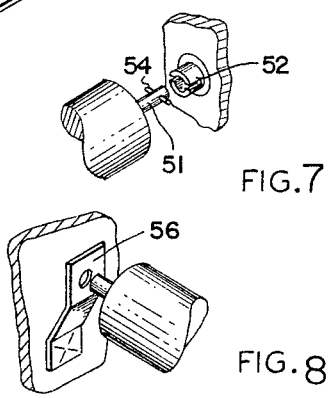
FIG. 7 is a fragmentary perspective view in exploded relation to one form of roll support mechanism.
Figure 8:
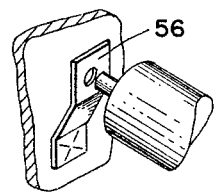
FIG. 8 is a fragmentary perspective view in exploded relation showing the other end of the roll of FIG. 7 and its mount.
Figure 9:
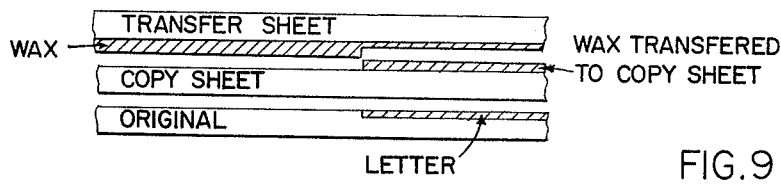
FIG. 9 is a diagrammatic view of manifolded sheets showing a portion of the wax transferred to the copy sheet in the area corresponding to the letter on the original.

The preferred embodiment of my invention herein shown includes in its general organization a box indicated generally at 10 in which the various elements are mounted. At the right hand end of the box as seen in FIG. 6, I mount a constant speed motor 12, a variac 14 and a transformer 16. The motor is used to drive a transfer sheet take-up roll 18 at a constant rate of about one revolution per second in this instance. The variac 14 and transformer 16 are used to supply voltage to a radiation lamp 20 or in one embodiment of the invention to radiation lamps 20 and 22.

The left hand side of the apparatus houses the copying elements which include the transfer sheet take up roll 18 already mentioned, also a transfer sheet supply roll 24, and a copying sheet supply roll 26. The transfer sheet supply roll 24 is provided with a spring loading braking arrangement 28 which also may be adjustable if desired, and it will then therefore be seen that when the transfer sheet 30 is threaded from roll 24 to roll 18 and the motor 12 is operated this will tension the transfer sheet 30 between the two said rolls.

The foregoing elements are mounted within the box 10 and the printing combination is completed by means of a print roll 32 mounted on a pivoting door 34 on the front of the machine. When the door 34 is closed and locked by a latch mechanism indicated at 36, the print roll 32 is brought into position at a printing station substantially between the rolls 18 and 24. In this way the transfer sheet 30 is tensioned across the innerface of the print roll 32. In this position the print roll 32 is located in front of the lights 20 and 22 being separated from the edge of shields 38 surrounding said lamps by a clearance sufficient to permit free access of the manifolded sheets which are applied to the print roll 32.

Thus, it will be seen that the operation of the motor 12 with a transfer sheet 30 connected between the rolls 18 and 24 tensions the transfer sheet 30 across the face of the print roll 32 and causes the same to rotate. A copy sheet 40 is threaded also across the face of the roll 32 under a take off roll 42 and out through an opening 44 in the door 34. The original to be copied is inserted through an opening 46 in the door 34 below the roll 32. Thus, the operation of the motor 12 serves to draw the copy sheet and the original through the printing area, under the lights, and out of the front of the machine under the take off roll 42, and through the opening 44.

The print roll is preferably hollow, thin-walled aluminum tube machined to provide a smooth substantially true cylinder. Preferably the ends are perforated to permit air circulation. When this is done no fans are necessary for continuous operation.

The take-off roll 42 is held under light spring force against pivot roll 32 by means of a spring rod 43 operating against sliding journal blades 45. A cam 47 attached to the latch 36 contacts rod 43 when the latch 36 is closed. This provides an automatic release for the take-off roll when the door 32 is opened and facilitates threading up the copy paper.

The rolls 18, 24 and 26 are mounted for quick change with their shafts 51 fitting at their drive ends into slotted hubs 52 with pins 54 ensuring fixed driving relation therewith. At their other ends shafts 51 fit into spring loaded bearings 56.

The electrical arrangement herein employed is arranged with an on-off switch 48 operating both the motor 12, and the lights 20 and 22. A door switch 50 is located in the light circuit so that the lights do not go on when the door 34 is opened. Thus the transfer sheet 30 may be threaded up and smoothed out without the inconvenience or glare of the light at such times. The lights employed are the commercially available 1000 T3 bulbs of G.E. and Sylvania designed to operate at 230 to 250 volts. In this instance, the transformer 16 doubles the voltage, and the variac 14 serves the purpose of reducing the voltage to accommodate variations in the printing intensity requirements of the apparatus. While the output of the bulb is probably more than 2000 watts, I find that the transformer 16 and variac 14 may have a capacity of 500 watts and still function properly. This is due to the fact that operation is relatively brief and intermittent.

Figure 12:
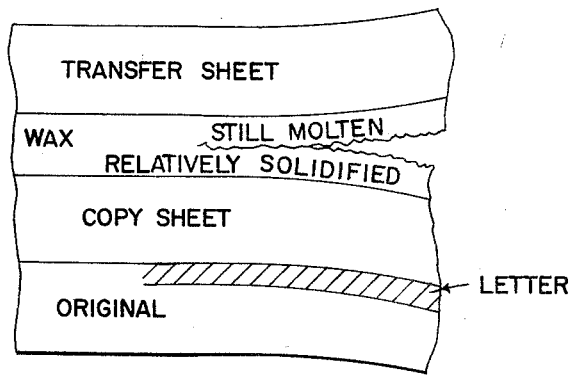
FIG. 12 is a diagrammatic view illustrating the separation point between the transfer sheet and the copy sheet.

In the operation of the process of my invention I have found that the condition of the coating of the transfer sheet in the areas corresponding to the letters on the original at the moment of separation of the transfer sheet and copy sheet is critical. Thus if the separation is too quick, the letters have a wet and stippled appearance and are relatively weak in intensity. Conversely if the sheets are permitted to remain in contact too long, the wax seems to solidify and hold more closely to the transfer sheet likewise leaving a weak image but without any stippled appearance in this instance. The best image is obtained when the wax on the transfer sheet is still relatively molten adjacent to the transfer sheet but somewhat solidified adjacent to the copy sheet. In this way the solidified portion adjacent to the copy sheet separates away from the transfer sheet and a rich, intense image results, see FIG. 12.

Figure 1:
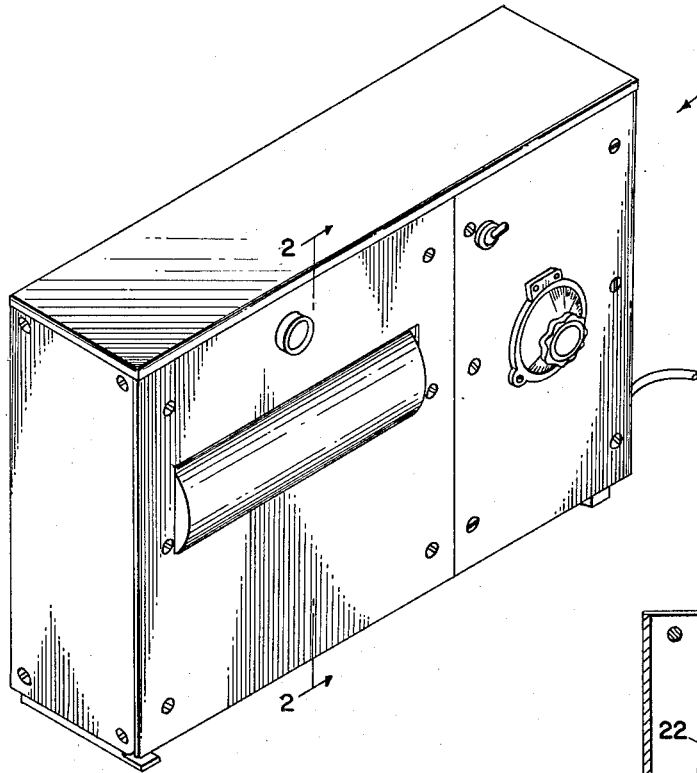
FIG. 1 is a view in perspective of the apparatus of my invention.
Figure 2:
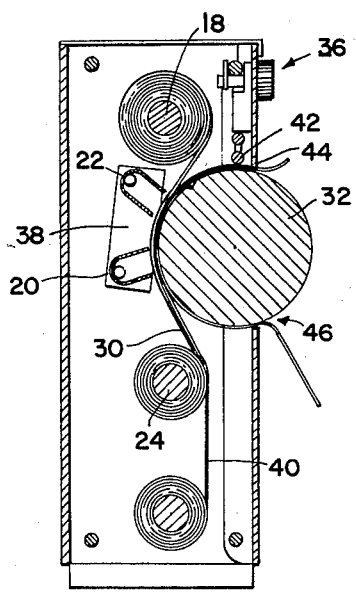
FIG. 2 is a cross-sectional view in side elevation taken along the lines to 2 in FIG. 1.
Figure 3:
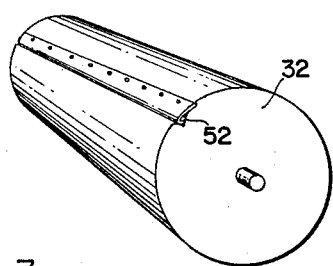
FIG. 3 is a view in perspective of the print roll.
Figure 4:
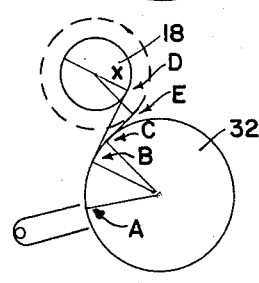
FIG. 4 is a diagrammatic view showing a relationship of tangents between the print roll and the wax transfer sheet take up roll.
Figure 5:
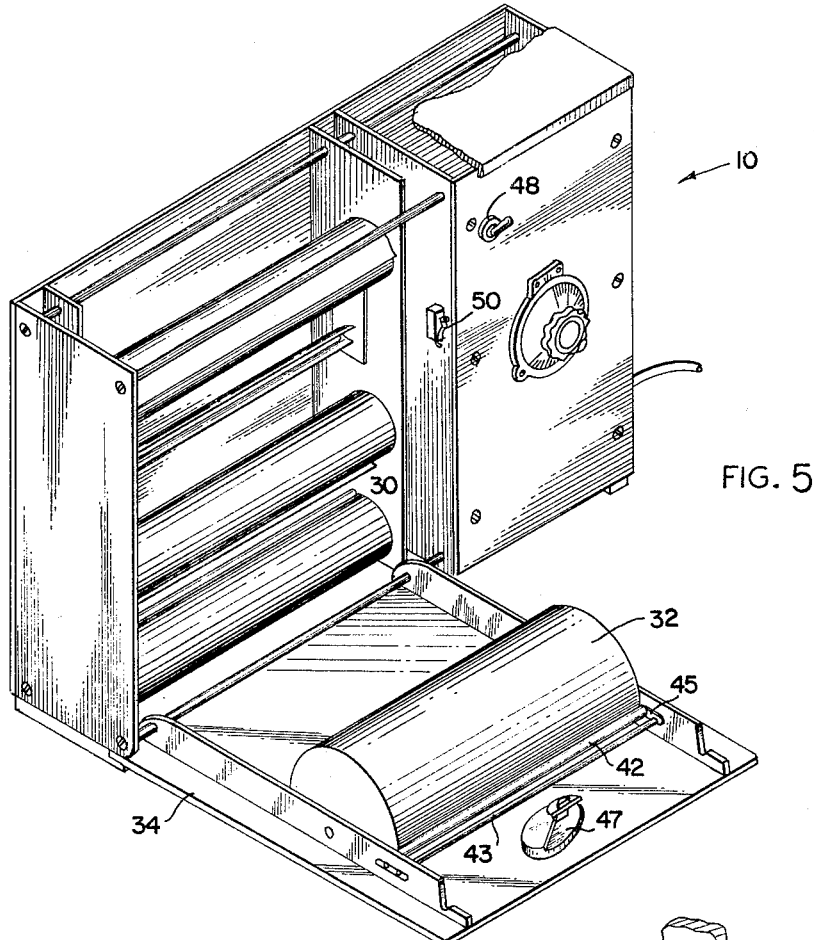
FIG. 5 is a view in perspective of the apparatus showing the front door in opened position with the internal elements of the machine exposed to view.

These facts have led to the establishment of critical relationships between the rate of throughput and the distance between the light and the point of separation between the copy sheet and the wax transfer sheet. In FIG. 4 I have shown a diagrammatic illustration of these elements for a given rate of throughput, which in a preferred embodiment may be approximately four inches per second. A suitable distance between the final point of application of the light designated as point A in FIG. 4 and the point of separation of the transfer and copy sheet designated at point B in FIG. 4 is approximately one inch. It will therefore be seen that one of several things must take place in order to keep the intensity of image uniformly rich. Either the throughput rate must be kept constant or some provision must be made to vary the length of contact with the print roll to account for changes in throughput rate. In the preferred embodiment of my invention herein shown I employ a constant speed motor 12 because this is by far the most economical form of motor available for this purpose and in order to keep the time of contact between the transfer sheet and the copy sheet uniform as the wax transfer sheet builds up on the roll 18, I position the roll 18 with respect to the roll 32 in such a way that the time of contact remains the same regardless of the increase of throughput rate due to the increase of effective circumference of roll 18. In FIG. 4 I have shown the roll 18 initially with a diameter of 2X and the length of contact between the transfer sheet and the copy sheet on the print roll 32 is defined between points A and B. In dotted lines the diameter of roll 18 is shown as increased by addition of transfer sheet thereto to a diameter of 3X and the length of contact between the transfer sheet and copy sheet on roll 32 is increased by a distance between points B and C. This increase in contact on the roll 32 is proportional to the increase of throughput rate due to the increase of diameter of the roll 18. Thus during operation the build up to transfer sheet on the roll 18 does not disturb the basic time relationship of contact between the transfer sheet and the copy sheet and a rich, intense image results despite changes in throughput rate. In this context the only thing that needs to be varied from one end of the run to the other is the intensity of the applied radiation.

Another way to control this critical relationship is to mount the lights 20 or 20 and 22 on a pivoting frame to swing concentrically with the axis of roll 32 when in pivoting position.

In one embodiment of my invention the circumference of the roll 32 is designed to coincide precisely with the length or width of the original to be copied. When this is done the original may be inserted under a spring loaded clip 52 in the print roll 23 and the machine may then be operated to produce continuously successive copies.

While my prior and copending applications have generally referred to dyed wax coatings, it will be understood that the processes herein and therein described are not necessarily limited to dyed wax coatings but copies may be made with clear wax. Other heat meltable substances such as polyethylene, thermoplastic resins, etc. also work. In addition, it is possible to run the copy made by these processes through a charged toner such as is used in the Electrofax process and obtain a dark, intense image.

Turning now to other aspects of the process of my invention I have discovered that the transfer of wax or other coating material from the transfer sheet to the copy sheet leaves the transfer sheet in a condition whereby the areas of the transfer sheet from which the wax has been removed seem to absorb the applied radiation to a greater extent than do the areas of the transfer sheet where the full thickness of the wax coating still remains. I am not certain as to why this occurs but I believe that it is due to the fact that the applied radiation is somewhat scattered in the areas where the wax has been removed. This scattering causes increased absorption. Also these areas have less mass to be heated. Thus the full thickness of the wax coating on the transfer sheet may serve somewhat as a heat sink which retards the temperature rise in those areas but, in the areas where the wax is thinner, the temperature rise can take place more rapidly. In any event I know that the temperature in areas of the letters during a second irradiation of the transfer and copy sheets rises more rapidly than elsewhere and can be used to print positively by what I term a secondary transfer illustrated diagrammatically in FIG. 10. Thus the anomaly results that the transfer sheet prints on the copy sheet in the areas of the transfer sheet where the wax coating is thinner or less.

Using the transfer sheet in this manner to produce a positive print is further enhanced by employing a piece of carbon paper interleaved between the transfer sheet and the copy sheet with waxed side toward the copy sheet. When this is done two things take place. First, the areas on the transfer sheet where the wax has been partially removed, i.e., the areas corresponding to the letters on the original, become hotter due to the increased absorption of heat therein. Second, more radiation penetrates through those areas to the carbon paper. Both of these factors contribute to melting the carbon paper locally in the areas corresponding to the letters on the original and black letters are transferred to the copy sheet.

In FIGS. 9 through 12 I have attempted to show the various points discussed herein diagrammatically with the areas of the letters running off to the right. It will be understood that the smallest width of an average letter is between 10 and 15 times the thickness of the sheets. Therefore, it is difficult to visualize the actual relationship of these elements without considering the letter as being more or less infinite in length.

Figure 10:
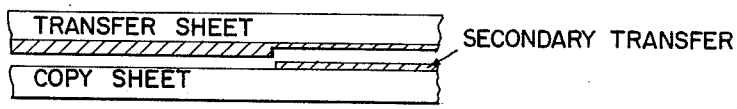
FIG. 10 is a diagrammatic view showing the secondary transfer of wax in the positive sense derived during a second application of radiation to the transfer sheet.
Figure 11:
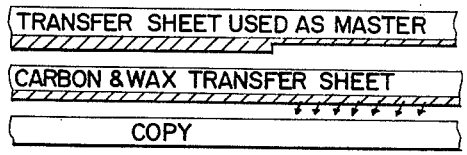
FIG. 11 is a diagrammatic view illustrating the use of the transfer sheet as a master together with a carbon and wax transfer sheet.

In the practice of my invention as herein shown, one drawback has been the fact that substantial gaps usually appear between printed areas on the transfer sheet. This can result in waste unless provision is made to compensate for it. One way is to provide automatic controls for the operation of the motor 12 so that the roll 32 makes its revolutions in such a way that a uniform space between printings results in the transfer sheet 30. Thereafter the transfer sheet 30 may be re-used with adjustment of spacing to bring the previously unused areas into the printing cycle on the second run. In any event, it is also possible to reuse the transfer sheet 30 two or three times even over the same printing areas and still obtain fairly good copy provided the initial run or runs does not remove too much of the wax. Under these conditions, the variac 14 may be adjusted so that the positive printing result discussed in relation to FIG. 10 is minimal and not too objectionable.

Since numerous minor variations of the preferred embodiment of my invention herein shown will now be obvious to those skilled in the art, it is not my intention to confine the invention to these preferred embodiments but rather to limit it in terms of the appended claims.

What I claim and desire to secure by Letters Patent of the United States is:

1. Apparatus for radiant energy copying having in combination; a base; a transfer sheet supply roll mounted for rotation on said base; a transfer sheet take-up roll mounted for rotation on said base; drive means for said take-up roll and braking means for said supply roll whereby transfer sheet fed from said supply roll to said take-up roll is tensioned between the two; a printing station substantially between said supply and take-up rolls; a print roll mounted for rotation on said base at said printing station whereby said transfer sheet is tensioned over said printing roll at said station; means for supplying and feeding a copy sheet between said print roll and said tensioned transfer sheet; a radiation source at said printing station directed at said transfer sheet and the transfer sheet take-up roll positioned with relation to said print roll and said radiation source in relation to the diameter of said take-up roll and print rolls so that, as the transfer sheet builds up on said take-up roll and the circumference thereof is effectively increased, the distance between said radiation source and the point of separation of said transfer and copy sheets remains substantially directly proportional to said circumference increase; whereby said drive means for said take-up roll may be a constant speed motor.

2. A thermographic copying machine adapted for radiant energy induced thermographic copying by front printing comprising in combination: a housing; a dampened transfer sheet supply roll and a driven transfer sheet take-up roll, both mounted for rotation in said housing; a constant speed drive operatively connected to said take-up roll and adapted to drive the same at a constant speed of rotation; a printing station intermediate said supply and take-up rolls; a print roll mounted for free rotation in said housing at said printing station and positioned to contact over a portion of its circumference a transfer sheet when said transfer sheet is passing under tension from said supply roll to said take-up roll; means for supplying a copy sheet between said print roll and said transfer sheet; means for supplying an indicia-bearing original between said copy sheet and said print roll with the indicia-bearing original between said copy sheet and said print roll with the indicia thereof against said copy sheet; means for separating said transfer sheet from said copy sheet after said printing station and for removing said copy sheet and said indicia-bearing original from said housing; and a radiant energy source at said printing station being adapted to direct radiant energy onto said transfer sheet on said print roll; said take-up roll being positioned relative to said print roll such that as the transfer sheet builds up on said take-up roll and the circumference thereof increases, the circumferential distance of contact between said transfer and copy sheets on said print roll increases in direct proportion thereto.

3. The copying machine of claim 2 including an addition thereto a thermographic transfer sheet tensioned over said print roll and running from said supply roll to said take-up roll with the transfer side thereof facing said print roll.

References Cited in the file of this patent

UNITED STATES PATENTS

| 2,740,895 | Miller | Apr. 3, 1956 |
| 2,769,391 | Roshkind | Nov. 6, 1956 |
| 2,825,814 | Walkup | Mar. 4, 1958 |
| 2,903,546 | O'Mara | Sept. 8, 1959 |
| 2,927,210 | O'Mara | Mar. 1, 1960 |

FOREIGN PATENTS

| 222,058 | Australia | May 29, 1959 |
| 1,243,009 | France | Aug. 29, 1960 |

OTHER REFERENCES

McMaster: "New Developments in Xeroradiography," Non-Destructive Testing, Summer Number 1951, page 18,